United States Patent
Lin (10) Patent No.: US 8,135,167 B2
(45) Date of Patent: Mar. 13, 2012

(54) METHOD FOR DETERMINING POWER-SAVE MODE OF MULTIMEDIA APPLICATION

(75) Inventor: Chang-Chou Lin, Taipei (TW)

(73) Assignee: Micro-Star Int'l Co., Ltd., Jung-He, Taipei (TW)

( * ) Notice: Subject to any disclaimer, the term of this patent is extended or adjusted under 35 U.S.C. 154(b) by 944 days.

(21) Appl. No.: 12/023,609

(22) Filed: Jan. 31, 2008

(65) Prior Publication Data

US 2009/0092293 A1    Apr. 9, 2009

(30) Foreign Application Priority Data

Oct. 3, 2007  (TW) ................................ 96137154 A (51) Int. Cl.
*G06K 9/00* (2006.01)
(52) U.S. Cl. ........................ 382/100; 382/118
(58) Field of Classification Search .................. 382/100, 382/115–124, 154, 209, 285, 307; 345/210–214, 345/202, 157, 419–420; 351/204; 356/71, 356/601–603, 611; 340/5.52–5.54, 5.81–5.85; 235/380; 250/221; 713/324
See application file for complete search history.

(56) References Cited

U.S. PATENT DOCUMENTS

| | | | | |
|---|---|---|---|---|
| 5,012,522 A * | 4/1991 | Lambert | ...................... | 382/118 |
| 5,504,908 A * | 4/1996 | Ikeda | ............................ | 713/300 |
| 5,598,565 A * | 1/1997 | Reinhardt | ..................... | 713/323 |
| 5,757,365 A * | 5/1998 | Ho | ................................. | 345/212 |
| 5,886,689 A * | 3/1999 | Chee et al. | .................... | 345/212 |
| 5,926,404 A * | 7/1999 | Zeller et al. | ................... | 713/321 |
| 5,978,923 A * | 11/1999 | Kou | .............................. | 713/323 |
| 6,111,517 A * | 8/2000 | Atick et al. | ................... | 340/5.83 |
| 6,115,033 A * | 9/2000 | Choi | ............................. | 345/211 |
| 6,121,962 A * | 9/2000 | Hwang | ......................... | 345/211 |
| 6,184,858 B1 * | 2/2001 | Christian et al. | .............. | 345/634 |
| 6,775,397 B1 * | 8/2004 | Hamalainen | .................. | 382/118 |
| 7,251,350 B2 * | 7/2007 | Tsirkel et al. | ................. | 382/118 |
| 2004/0081337 A1* | 4/2004 | Tsirkel et al. | ................. | 382/118 |
| 2006/0192775 A1* | 8/2006 | Nicholson et al. | ............ | 345/211 |
| 2009/0119698 A1* | 5/2009 | Kuijlaars | ........................ | 725/25 |

* cited by examiner

*Primary Examiner* — Samir Ahmed
*Assistant Examiner* — Mehdi Rashidian
(74) *Attorney, Agent, or Firm* — Morris Manning & Martin LLP; Tim Tingkang Xia, Esq.

(57) ABSTRACT

A method for determining a power-save mode of multimedia application, when a user operates a computer system through a peripheral input device, an image sensor retrieves a first image data corresponding to the user's facial feature. Next, the first image data is stored into the computer system. Then, the computer system confirms whether an input signal from the peripheral input device is received or not within a preset time. Once the preset time is reached, the image sensor is used to retrieve a second image data. Then, the computer system compares the second image data with the first image data, and if the matching rate between the second image data and the first image data falls out of a specific range, the computer system enters the power-save mode.

14 Claims, 6 Drawing Sheets

METHOD FOR DETERMINING POWER-SAVE MODE OF MULTIMEDIA APPLICATION

CROSS-REFERENCE TO RELATED APPLICATIONS

This non-provisional application claims priority under 35 U.S.C. §119(a) on Patent Application No(s). 096137154 filed in Taiwan, R.O.C. on Oct. 3, 2007, the entire contents of which are hereby incorporated by reference.

BACKGROUND OF THE INVENTION

1. Field of the Invention

The present invention relates to a method for determining a power-save mode of a computer system. More particularly, the present invention relates to a method for determining a power-save mode of multimedia application.

2. Related Art

Notebook computer has personally-used and portable characteristics, so the security and power-save property thereof have always been important topics. Currently, as for the commonly used operation system (Windows), in order to achieve the secure and power-save effects, it provides a user with a function of setting a time period (for example, 3 minutes). When the computer system does not detect any operation from the user within the preset time period, some secure measures are taken, for example, display and keyboard are locked, and certain power-save measures are taken, for example, the display is turned off, the screen protection program is activated, the hard disk is turned off, or the computer system is guided to enter a standby mode and a sleeping mode, so as to reduce the power consumption of the computer system.

However, the above processes for determining the power-save mode of the computer system have some problems. For example, when the user is reading a document or watching a movie, and does not press the keyboard or touch the mouse within the preset time, at this time, it is determined that the computer system enters an idle state. Then, the operation system may activate the screen protection program, the hard disk is turned off, or the system enters the sleeping mode, and the user must press the keyboard or the mouse once again to wake up the computer system and to resume the normal mode, and thus causing inconveniences in usage.

In addition, when the user leaves the computer alone for a certain time period, the computer system enters the power-save mode according to the default settings. At this time, if some other person presses the keyboard or touches the mouse, the computer system may enter the normal mode from the power-save mode, and the data image formerly edited or read by the user may be viewed by the other person, such that the insecurity problem occurs. Therefore, the computer system generally sets a password validation mechanism to avoid the above situation, but the operations for the password validation mechanism are not so convenient. For example, the user needs to press the keyboard or touch the mouse firstly to activate the password validation mechanism, and then inputs the correct password, so as to release the power-save mode, which thus needs to be improved in terms of the operational convenience.

Therefore, how to provide a method for determining a power-save mode that is capable of increasing the operational convenience has become an urgent problem to be solved by the researchers.

SUMMARY OF THE INVENTION

In view of the above problems, the present invention provides a method for determining a power-save mode of multimedia application, which includes the following steps. An image sensor in a computer system is used to obtain a user's facial image data. Next, it is determined whether the facial image data exists or not, so as to determine whether the computer system enters the power-save mode or not. Then, when it is determined that the facial image data exists, it automatically resumes a normal mode from the power-save mode, thereby enhancing the operational convenience of the computer system.

The method for determining the power-save mode of the multimedia application according to the present invention takes an image data retrieved by the image sensor as a determining reference for controlling the computer system to enter the power-save mode from the normal mode. The method includes the following steps. Firstly, when the user operates the computer system through a peripheral input device (for example, activates a power source or presses a specific key), the image sensor retrieves a first image data corresponding to the user's facial feature. Next, the first image data is stored to a memory or a hard disk of the computer system. Then, the computer system confirms whether an input signal from the peripheral input device (for example, keyboard or mouse) is received or not within a preset time. Once the preset time is reached, a second image data is retrieved by the image sensor. Then, the computer system compares the second image data with the first image data. When a matching rate between the second image data and the first image data falls out of a specific range (for example, from 60% to 100%), the computer system enters the power-save mode.

The method for determining the power-save mode of the multimedia application according to the present invention takes an image data retrieved by the image sensor as a determining reference for controlling the computer system to enter the power-save mode from the normal mode. The method includes the following steps. Firstly, when the user operates the computer system through a peripheral input device (for example, activates power source or presses a specific key), the image sensor retrieves a first image data corresponding to the user's facial feature. Next, the first image data is stored to a memory or a hard disk of the computer system. Then, the computer system confirms whether an input signal from the peripheral input device (for example, keyboard or mouse) is received or not within a preset time. Once the preset time is reached, a second image data is retrieved by the image sensor. Then, the computer system compares the second image data with the first image data. When the matching rate between the second image data and the first image data falls out of a specific range (for example, from 60% to 100%), the computer system enters the power-save mode. Then, when the computer system confirms that the input signal is received, the image sensor retrieves a third image data. Then, the computer system compares the third image data with the first image data. When a matching rate between the third image data and the first image data falls within the specific range, the computer system enters the normal mode from the power-save mode.

Through the method for determining the power-save mode of the multimedia application, the image sensor is used to sense whether the user's facial image exists or not, so as to determine whether the computer system is being used, and thus controlling the computer system to enter the power-save mode or not, and meanwhile avoiding the troubles caused by the conventional way of determining the operation mode by sensing whether the peripheral input device is touched or not, for example, the computer system enters the power-save mode when the user is reading a document or watching a movie without pressing the keyboard or touching the mouse within a certain time period. In addition, in the present invention, the facial image recognition and the matching rate mechanism is further used, such that once the computer system enters the power-save mode, it is restricted that only a specific user can make the computer system resume the normal mode from the power-save mode. Besides enhancing the data security, the operational convenience in the present invention is further enhanced compared with the conventional manner of adopting the password validation mechanism to finish the switching among operational modes, that is because, in the present invention, the user only needs to show his/her face within the sensing scope of the image sensor for being sensed, so as to make the computer system finish the switching among operational modes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 1A:
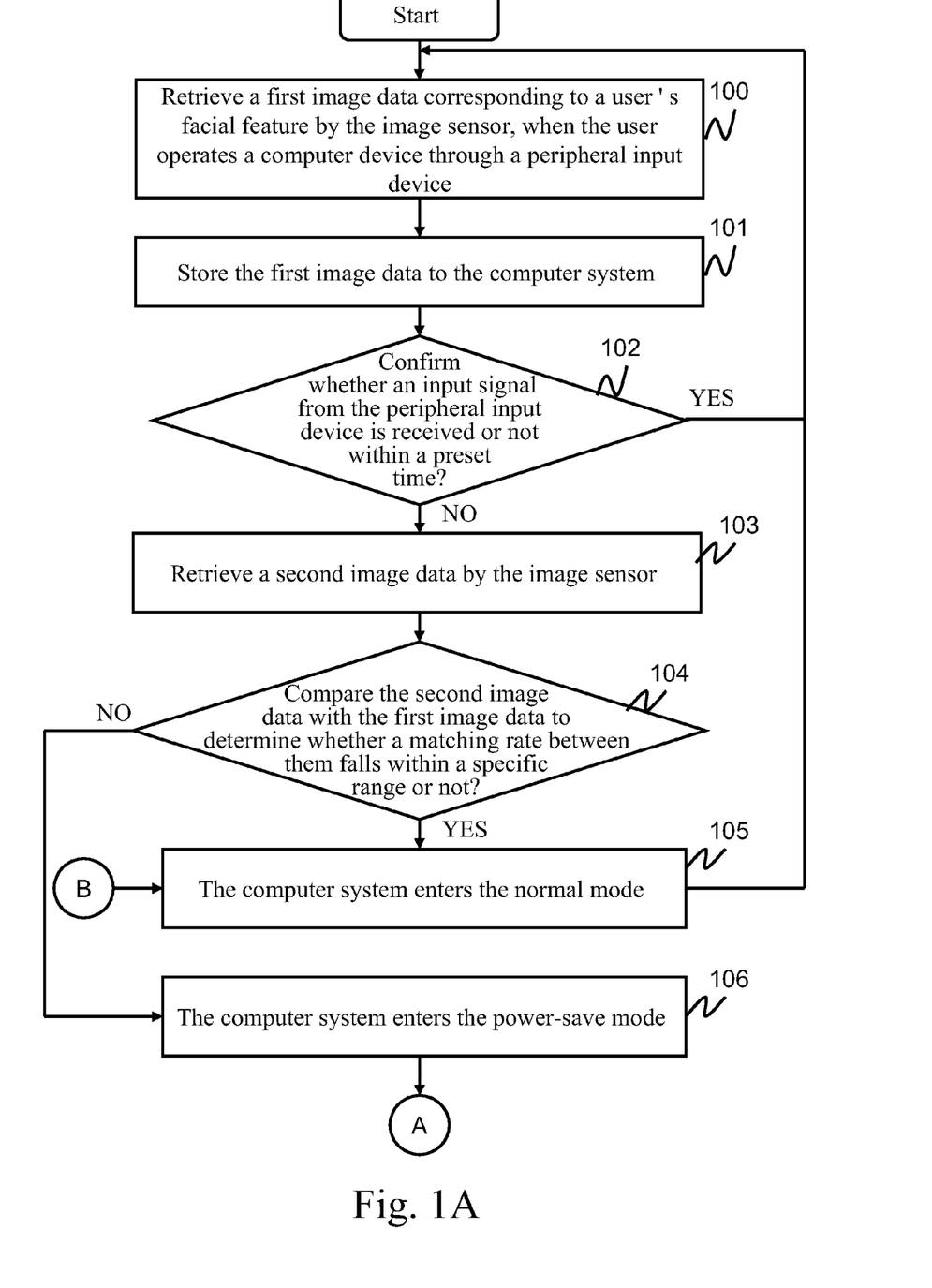
FIGS. 1A and 1B are flow charts of a method according to a first embodiment of the present invention.
Figure 1B:
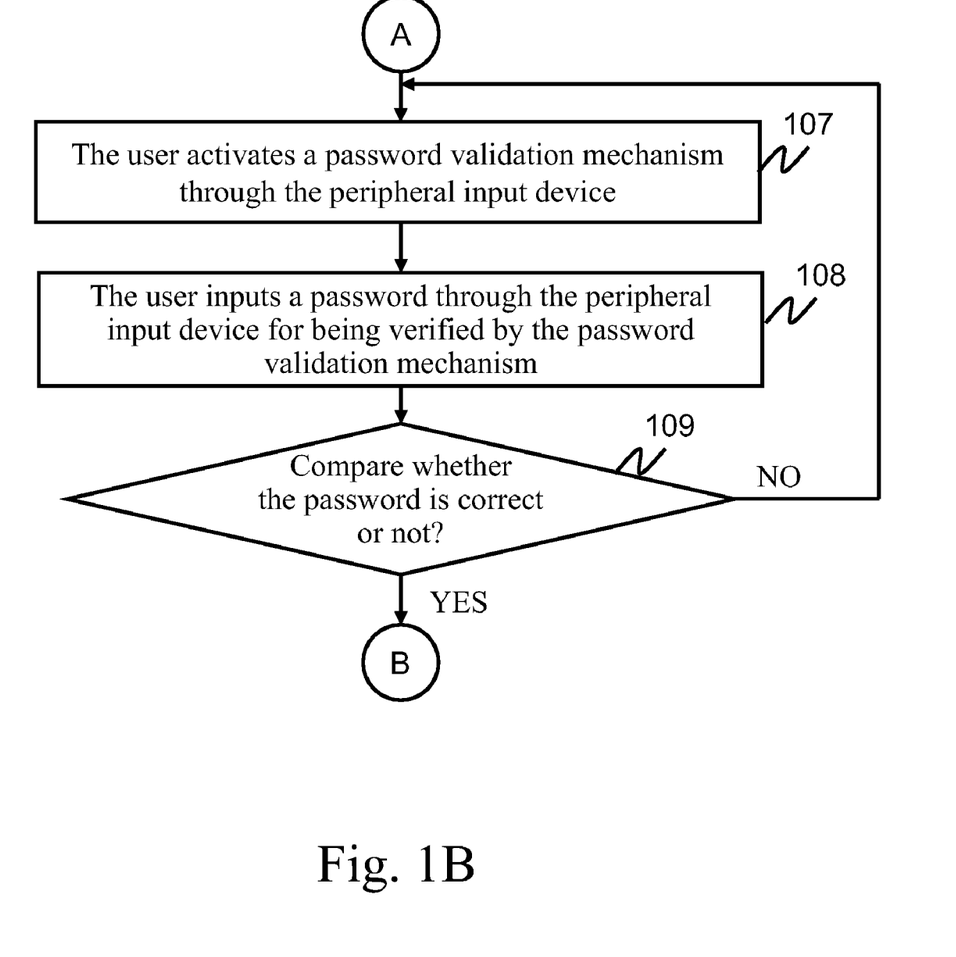

Referring to FIGS. 1A and 1B, they are flow charts of a method according to a first embodiment of the present invention. As shown in FIGS. 1A and 1B, in the method for determining the power-save mode of the multimedia application according to the present invention, an image data retrieved by an image sensor is taken as a determining reference for controlling a computer system to enter a power-save mode from a normal mode. The method includes the following steps.

Firstly, when the user operates the computer device (for example, activates the power source, or presses the keyboard or touches the mouse) through a peripheral input device (for example, keyboard, mouse, or touch panel), the image sensor retrieves a first image data corresponding to the user's facial feature (for example, eyes, nose, and/or mouth) (Step 100). The first image data may be obtained by a human face detection algorithm including an image processing technique and an eigenvalue retrieving technique, in which the image processing technique includes region division, blur processing, edge detection, and edge approximation. Targets of the eigenvalue retrieving technique include eigenvalue of eyes, eigenvalue of nose, and eigenvalue of mouth. As for the eigenvalue of eye, the canthus coordinates is taken as the position of the eyes, and the image processing technique is used together to assure the position of the eyes in the facial image, and then the eigenvector value is calculated. As for the eigenvalue of the nose, coordinates on two sides of nostrils are taken as the position of the nose, the image processing technique is used together to assure the position of the nose in the facial image, and then the eigenvector value is calculated. As for the eigenvalue of the mouth, coordinates of the corners of the mouth is taken as the position of the mouth, the image processing technique is used together to assure the position of the mouth in the facial image, and then the eigenvector value is calculated. In addition, the user may show his/her face within the sensing scope of the image sensor to enhance the successful rate of the recognition action, which is preferably 0.5 to 1.5 meters away from the image sensor.

Next, the first image data retrieved by the image sensor is stored to a memory or a hard disk of the computer system (Step 101).

It is confirmed whether an input signal from the peripheral input device is received or within a preset time (for example, 3 minutes) (Step 102), in which the preset time may be set by the user, and the input signal corresponds to a specific key or composite key.

When the computer system receives an input signal from the peripheral input device within the preset time, it returns to Step 100.

Once the preset time is reached and the computer system does not receive any input signal from the peripheral input device, a second image data is retrieved by the image sensor (Step 103). At this time, the second image data retrieved by the image sensor may be, for example, an environmental image or a facial image, and the process for obtaining the second image data is the same as that mentioned in Step 100, so it is not repeatedly described here.

The computer system compares the second image data with the first image data, so as to determine whether a matching rate between them falls within a specific range or not (Step 104). The matching rate may be the matching percentage for each eigenvector value in the second image data to that in the first image data. When the matching rate reaches the specific range (for example, 60%, 65%, 70%, 75%, 80%, 85%, 90%, 95%, or 100%), the preferred value of the specific range provided by the present invention is 80%, and the scope may be set by the user.

When the matching rate between the third image data and the first image data falls within the specific range, the computer system enters the normal mode (Step 105). In this manner, after the computer system enters the power-save mode, the user can make the computer system finish the switching among the operational modes, without using the operation procedures of the conventional password validation mechanism, so it has preferred operational convenience.

When the matching rate between the second image data and the first image data falls out of the specific range (for example, the matching rate is from 0% to 59%), the computer system enters the power-save mode (Step 106). The power-save mode provided by the present invention is a power source operational mode of advanced configuration & power interface (ACPI), particularly the $3^{th}$ (S3) mode, but the present invention is not limited thereby. In the following description, the sleeping state in the ACPI power source operational mode is illustrated. Firstly, the sleeping state is divided into 6 levels, namely, the $0^{th}$ (S0) mode to the $5^{th}$ (S5) modes in sequence. The $0^{th}$ (S0) mode is a normal operation mode, that is, it does not enter the sleeping state, and all the devices in the system are in the normal operation state.

Under the $1^{th}$ (S1) mode, the central processing unit (CPU) (not shown) stops working. If wake up action is executed, the computer system resumes the normal operation, data in the system cannot be lost, and the system returns to the state before sleeping.

Under the $2^{th}$ (S2) mode, it is similar to the $1^{th}$ (S1) mode, but the CPU (not shown) is in an OFF state, so the data in cache memory (not shown) may be lost. If the wake up action is executed, it is necessary for the operation system to re-maintain the data in the CPU and that in the cache memory.

Under the $3^{th}$ (S3) mode, the computer system only keeps the data in the memory, other data such as data in the CPU, cache memory, chipset (for example, south bridge chip and north bridge chip, etc.), and peripherals are all lost. Under this mode, the wake up action may be executed to directly obtain the registered data from the memory to continue the operations, without waiting for the operation system or re-executing the applications, thereby enhancing the speed for the computer system to resume its original operation mode. However, in the embodiment of the present invention, besides supplying power to the memory, the power is also supplied to the image sensor.

The $4^{th}$ (S4) mode is a disk sleeping state. Under this mode, the power consumption is at the lowest level, but the time cost for the computer system to resume the operations is relatively long, and at this time, all the equipments in the computer system are in an OFF state. Therefore, no power source is required, and the $5^{th}$ (S5) mode is similar to the $4^{th}$ (S4) mode, but the operation system does not maintain and store any data content.

Therefore, when the computer system enters the $3^{th}$ (S3) mode, it is only necessary to supply the power to the memory and the image sensor. Under this mode, the system quickly resumes the operations, and meanwhile, the execution efficiency for the computer is further enhanced.

In order to prevent the problem that the facial image recognition and matching rate mechanism cannot make the computer system switch from the power-save mode to the normal mode, in the first embodiment of the present invention, the password validation mechanism may still be used to make the computer system resume the normal mode. Referring to FIG. 1B, the user activates the password validation mechanism through the peripheral input device (Step 107), in which the user can activate the password validation mechanism by pressing a specific key or composite key on the keyboard, by touching the mouse or the touch panel.

Next, the user inputs a password through the peripheral input device for being verified by the password validation mechanism (Step 108), so as to verify the user's identity.

The computer system compares whether the password input by the user is correct or not (Step 109). If the password is correct, Step 105 is performed to make the computer enter the normal mode. If the password is not correct, it returns to Step 107 to continue the password validation procedure.

Figure 2A:
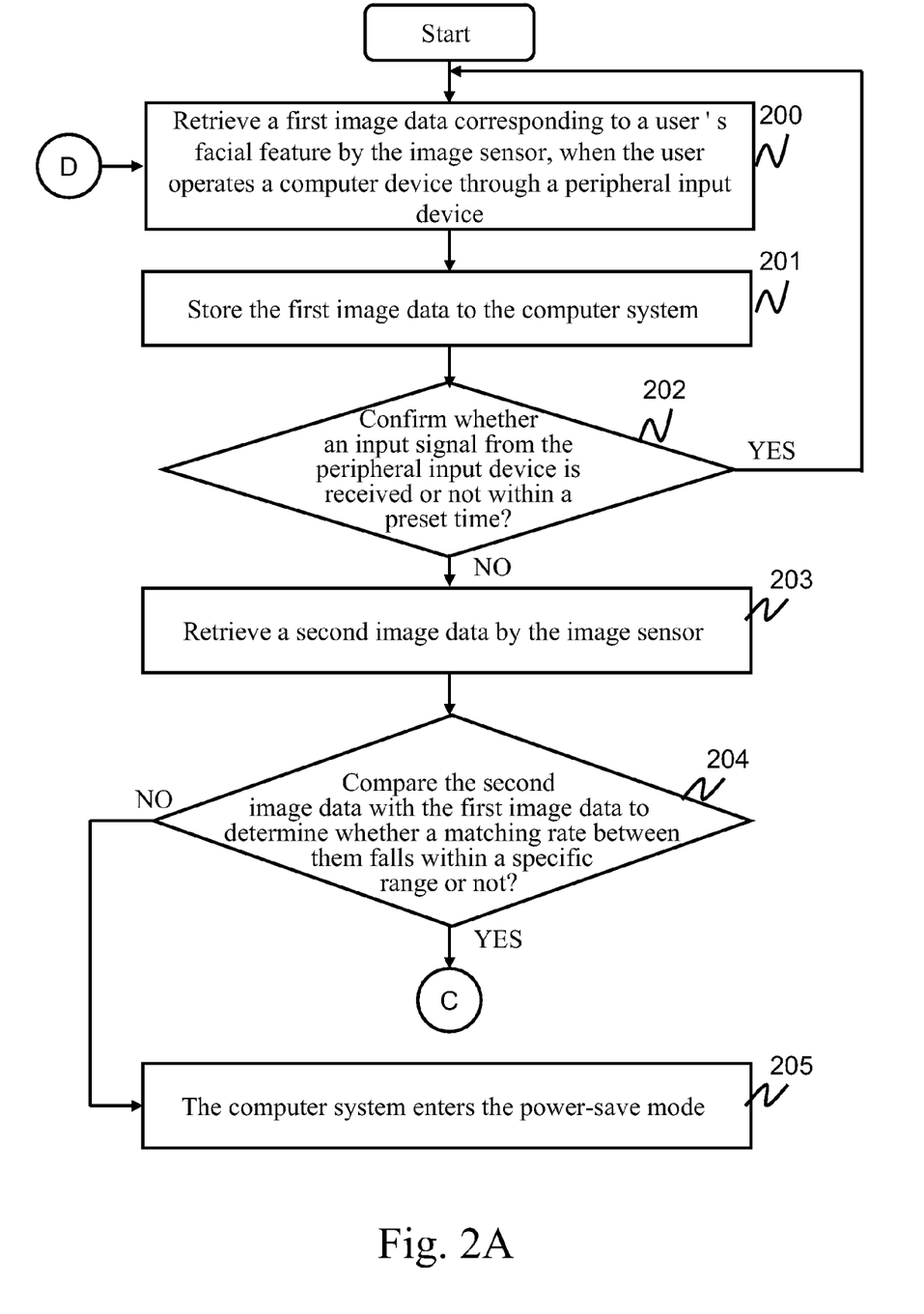
FIGS. 2A and 2B are flow charts of a method according to a second embodiment of the present invention.
Figure 2B:
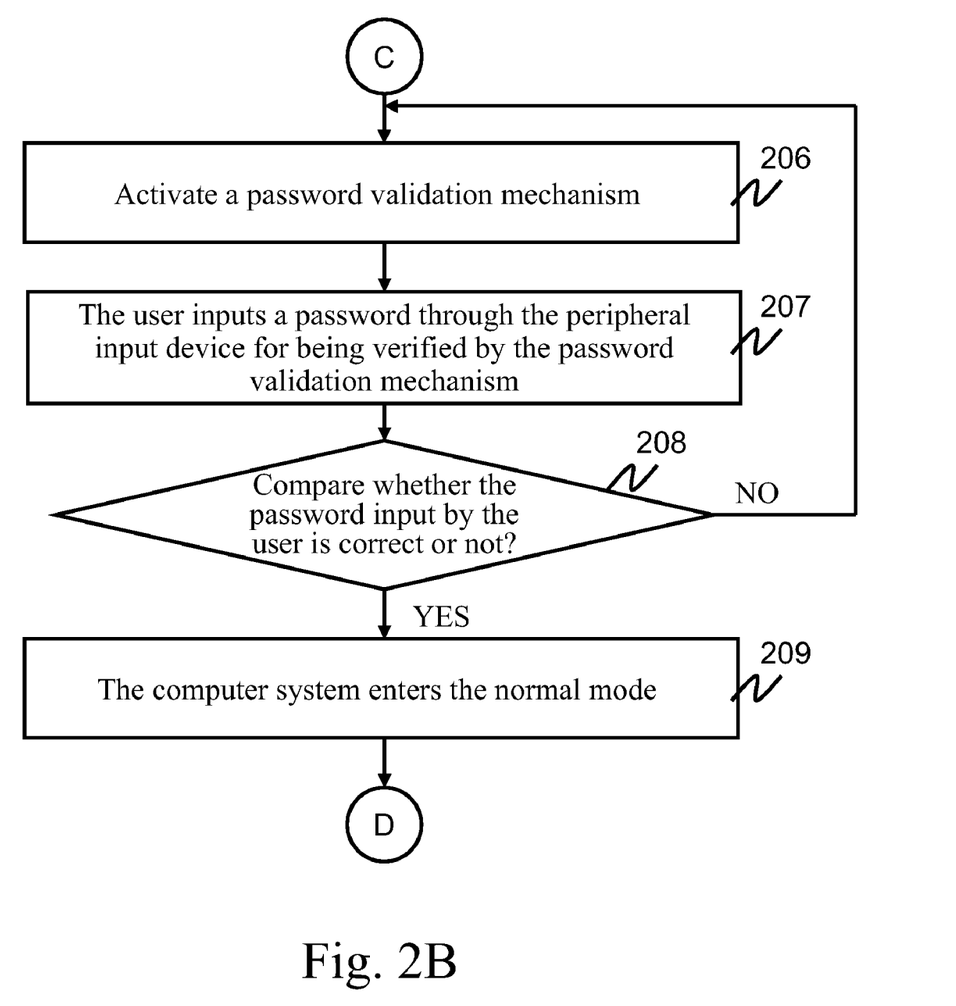

Referring to FIGS. 2A and 2B, they are flow charts of a method according to a second embodiment of the present invention. As shown in FIGS. 2A and 2B, in the method for determining the power-save mode of the multimedia application according to the present invention, an image data retrieved by the image sensor is taken as a determining reference for controlling the computer system to enter the power-save mode from the normal mode. The method includes the following steps.

Firstly, when the user operates the computer device (for example, activates the power source, or presses the keyboard or touches the mouse) through a peripheral input device (for example, keyboard, mouse, or touch panel), the image sensor retrieves a first image data corresponding to the user's facial feature (for example, eyes, nose, and/or mouth) (Step 200).

The first image data may be obtained by a human face detection algorithm including an image processing technique and an eigenvalue retrieving technique, in which the image processing technique includes region division, blur processing, edge detection, and edge approximation. Targets of the eigenvalue retrieving technique include eigenvalue of eyes, eigenvalue of nose, and eigenvalue of mouth. As for the eigenvalue of eye, the canthus coordinates is taken as the position of the eyes, and the image processing technique is used together to assure the position of the eyes in the facial image, and then the eigenvector value is calculated. As for the eigenvalue of the nose, coordinates on two sides of nostrils are taken as the position of the nose, the image processing technique is used together to assure the position of the nose in the facial image, and then the eigenvector value is calculated. As for the eigenvalue of the mouth, coordinates of the corners of the mouth is taken as the position of the mouth, the image processing technique is used together to assure the position of the mouth in the facial image, and then the eigenvector value is calculated. In addition, the user may show his/her face within the sensing scope of the image sensor to enhance the successful rate of the recognition action, which is preferably 0.5 to 1.5 meters away from the image sensor.

Next, the first image data retrieved by the image sensor is stored to a memory or a hard disk of the computer system (Step 201).

It is confirmed whether an input signal from the peripheral input device is received or not within a preset time (for example, 3 minutes) (Step 202), in which the preset time may be set by the user, and the input signal corresponds to a specific key or composite key.

When the computer system receives an input signal from the peripheral input device within the preset time, it returns to Step 200.

Once the preset time is reached and the computer system does not receive any input signal from the peripheral input device, a second image data is retrieved by the image sensor (Step 203). At this time, the second image data retrieved by the image sensor may be for example an environmental image or a facial image, and the process for obtaining the second image data is the same as that mentioned in Step 200, so it is not repeatedly described here.

The computer system compares the second image data with the first image data, so as to determine whether a matching rate between them falls within a specific range or not (Step 204). The matching rate may be a matching percentage for each eigenvector value in the second image data to that in the first image data. When the matching rate reaches a specific range (for example, 60%, 65%, 70%, 75%, 80%, 85%, 90%, 95%, or 100%), the preferred value of the specific range provided by the present invention is 80%, and the scope may be set by the user.

When the matching rate between the second image data and the first image data falls out of the specific range, the computer system enters the power-save mode (Step 205).

Referring to FIG. 2B, when the matching rate between the second image data and the first image data falls within the specific range, the computer system activates a password validation mechanism (Step 206), and Step 206 aims at preventing another user from releasing the power-save mode by using a picture of the original user, so as to invade the computer system. In other words, the second embodiment of the present invention has a dual protection mechanism, which further enhances the data security of the computer system.

Next, the user inputs a password through the peripheral input device for being verified by the password validation mechanism (Step 207), so as to verify the user's identity.

The computer system compares whether the password input by the user is correct or not (Step 208). If the password is correct, the computer is made to enter the normal mode (Step 209). If the password is not correct, it returns to Step 206 to continue the password validation procedure.

Figure 3A:
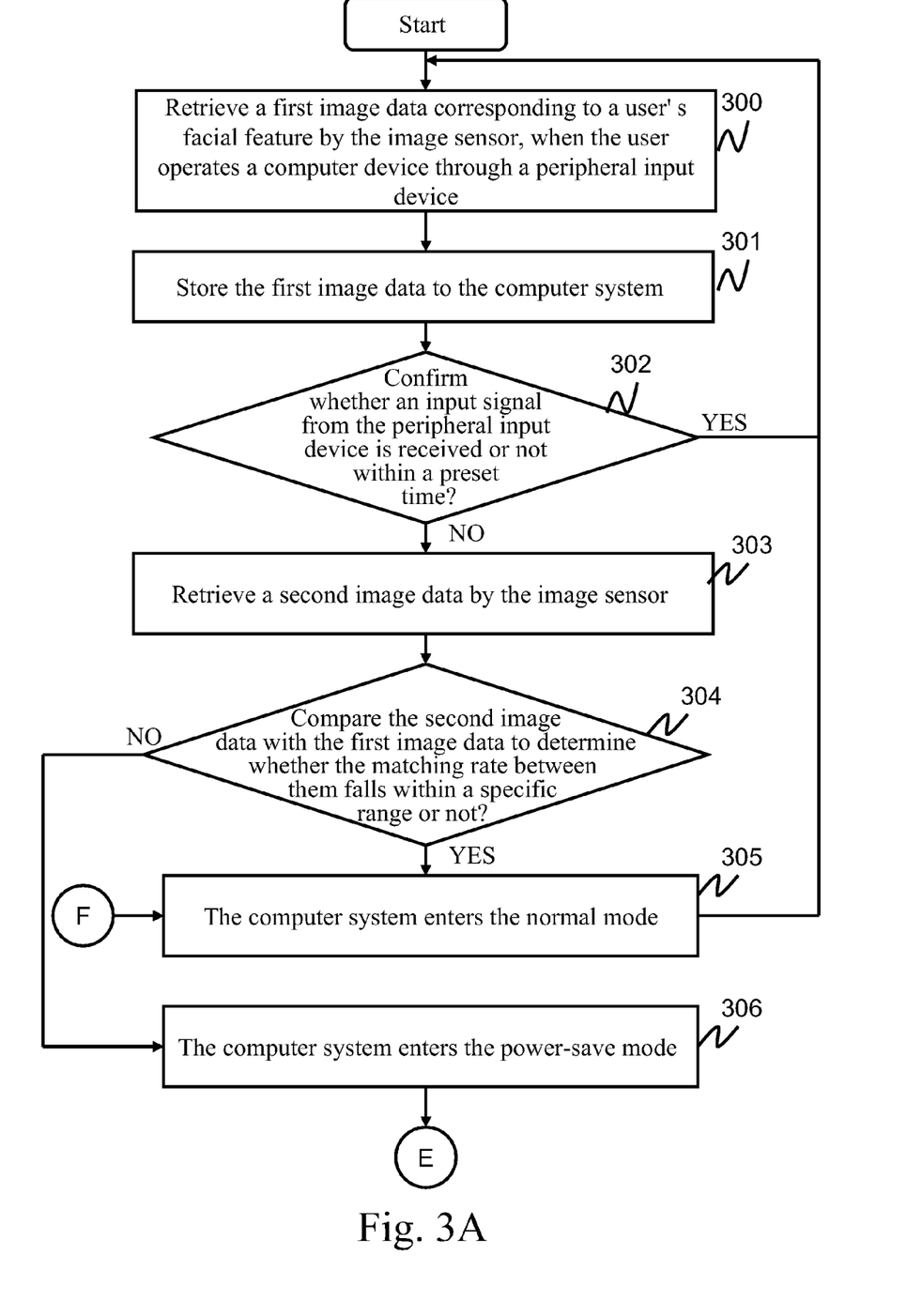
FIGS. 3A and 3B are flow charts of a method according to a third embodiment of the present invention.
Figure 3B:
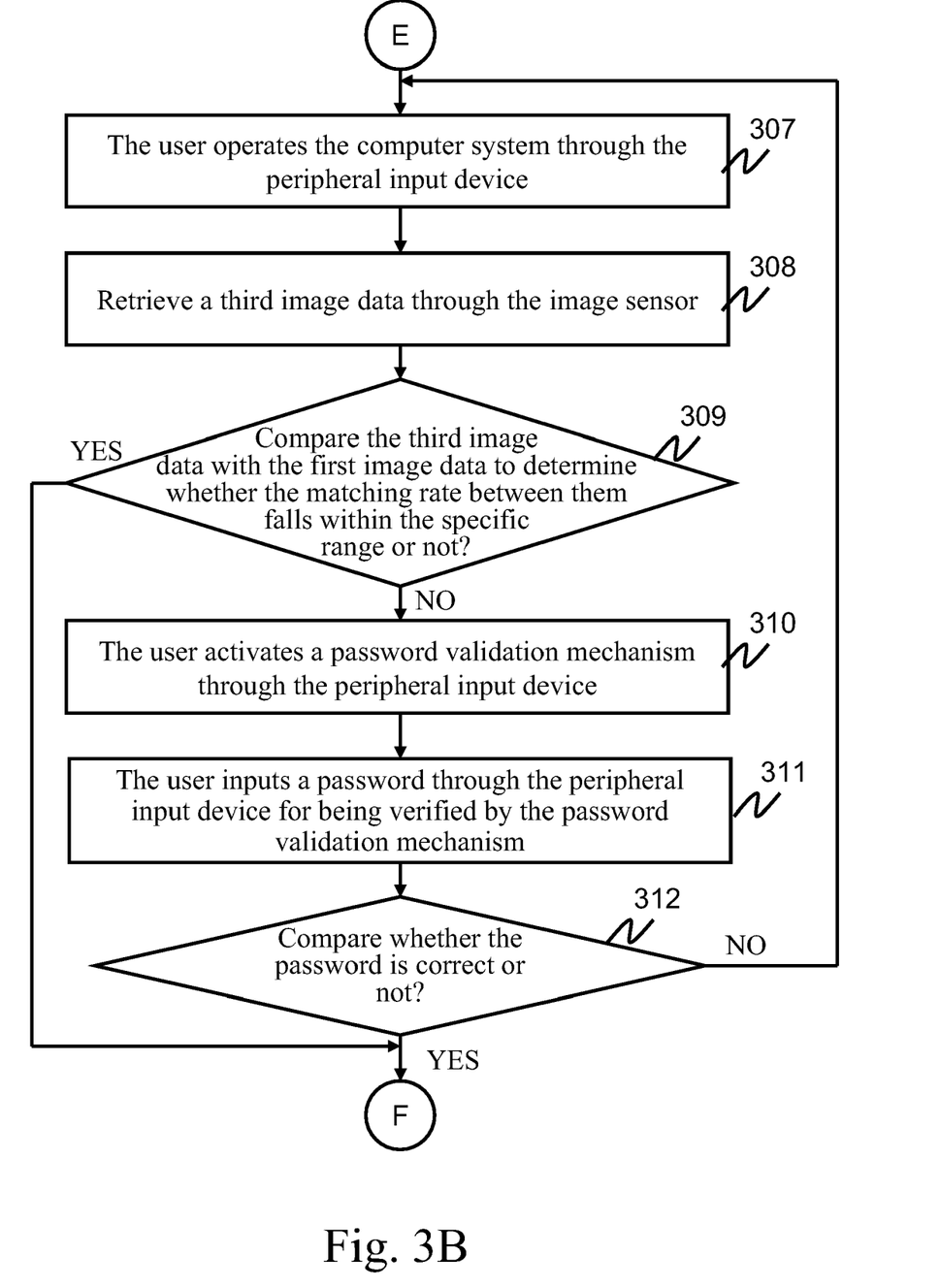

Referring to FIGS. 3A and 3B, they are flow charts of a method according to a third embodiment of the present invention. As shown in FIGS. 3A and 3B, in the method for determining the power-save mode of the multimedia application according to the present invention, an image data retrieved by the image sensor is taken as a determining reference for controlling the computer system to enter the power-save mode from the normal mode. The method includes the following steps.

Firstly, when the user operates the computer device (for example, activates the power source, or presses the keyboard or touches the mouse) through a peripheral input device (for example, keyboard, mouse, or touch panel), the image sensor retrieves a first image data corresponding to the user's facial feature (for example, eyes, nose, and/or mouth) (Step 300). The first image data may be obtained by a human face detection algorithm including an image processing technique and an eigenvalue retrieving technique, in which the image processing technique includes region division, blur processing, edge detection, and edge approximation. Targets of the eigenvalue retrieving technique include eigenvalue of eyes, eigenvalue of nose, and eigenvalue of mouth. As for the eigenvalue of eye, the canthus coordinates is taken as the position of the eyes, and the image processing technique is used together to assure the position of the eyes in the facial image, and then the eigenvector value is calculated. As for the eigenvalue of the nose, coordinates on two sides of nostrils are taken as the position of the nose, the image processing technique is used together to assure the position of the nose in the facial image, and then the eigenvector value is calculated. As for the eigenvalue of the mouth, coordinates of the corners of the mouth is taken as the position of the mouth, the image processing technique is used together to assure the position of the mouth in the facial image, and then the eigenvector value is calculated. In addition, the user may show his/her face within the sensing scope of the image sensor to enhance the successful rate of the recognition action, which is preferably 0.5 to 1.5 meters away from the image sensor.

Next, the first image data retrieved by the image sensor is stored to a memory or a hard disk of the computer system (Step 301).

It is confirmed whether an input signal from the peripheral input device is received or not within a preset time (for example, 3 minutes) (Step 302), in which the preset time may be set by the user, and the input signal corresponds to a specific key or composite key.

When the computer system receives an input signal from the peripheral input device within the preset time, it returns to Step 300.

Once the preset time is reached and the computer system does not receive any input signal from the peripheral input device, a second image data is retrieved by the image sensor (Step 303). At this time, the second image data retrieved by the image sensor may be for example an environmental image or a facial image, and the process for obtaining the second image data is the same as that mentioned in Step 200, so it is not repeatedly described here.

The computer system compares the second image data with the first image data, so as to determine whether a matching rate between them falls within a specific range or not (Step 304). The matching rate may be a matching percentage for each eigenvector value in the second image data to that in the first image data. When the matching rate reaches a specific range (for example, 60%, 65%, 70%, 75%, 80%, 85%, 90%, 95%, or 100%), the preferred value of the specific range provided by the present invention is 80%, and the scope may be set by the user.

When the matching rate between the second image data and the first image data falls within the specific range, the computer system enters the normal mode (Step 305).

When the matching rate between the second image data and the first image data falls out of the specific range (for example, the matching rate is from 0% to 59%), the computer system enters the power-save mode (Step 306).

Referring to FIG. 3B, after the computer system enters the power-save mode, if the user intends to make the computer system resume the normal mode, the user operates the computer system through the peripheral input device (Step 307). For example, the user may press a specific key or composite key on the keyboard, touch the mouse or the touch panel, so as to active the facial image retrieving function.

Next, the computer system retrieves a third image data through the image sensor (Step 308).

The computer system compares the third image data with the first image data, so as to determine whether the matching rate between them falls within the specific range or not (Step 309). The process for obtaining the third image data is the same as that mentioned in Step 300, so it is not repeatedly described here.

Similarly, in order to prevent the problem that the facial image recognition and matching rate mechanism cannot make the computer system resume the normal mode from the power-save mode, in the third embodiment of the present invention, the password validation mechanism may still be used to make the computer system resume the normal mode. The user activates the password validation mechanism through the peripheral input device (Step 310), in which the user can activate the password validation mechanism by pressing a specific key or composite key on the keyboard, touching the mouse or the touch panel.

Next, the user inputs a password through the peripheral input device for being verified by the password validation mechanism (Step 311), so as to verify the user's identity.

The computer system compares whether the password input by the user is correct or not (Step 312). When the password is correct, it turns to Step 305 to make the computer enter the normal mode. When the password is not correct, it returns to Step 307 to continue the password validation procedure.

To sum up, in the method for determining the power-save mode of the multimedia application, the image sensor is used to sense whether the user's facial image exists or not, so as to determine whether the computer system is being used, and thus controlling the computer system to enter the power-save mode or not, and meanwhile avoiding the troubles caused by the conventional way of determining the operation mode by sensing whether the peripheral input device is touched or not, for example, the computer system enters the power-save mode when the user is reading a document or watching a movie without pressing the keyboard or touching the mouse within a certain time period. In addition, in the present invention, the facial image recognition and the matching rate mechanism is further used, such that once the computer system enters the power-save mode, it is restricted that only a specific user can make the computer system resume the normal mode from the power-save mode. Besides enhancing the data security, the operational convenience in the present invention is further enhanced compared with the conventional manner of adopting the password validation mechanism to finish the switching among operational modes, that is because, in the present invention, the user only needs to show his/her face within the sensing scope of the image sensor for being sensed, so as to make the computer system finish the switching among operational modes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for determining a power-save mode of multimedia application, taking an image data retrieved by an image sensor as a determining reference for controlling a computer system to enter a power-save mode from a normal mode, comprising:
    retrieving a first image data corresponding to a plurality of a user's facial features including a first eigenvector of eyes, a first eigenvector of nose and a first eigenvector of mouth by the image sensor, when the user operates the computer system through a peripheral input device;
    storing the first image data to the computer system;
    confirming whether an input signal from the peripheral input device is received or not within a preset time by the computer system;
    retrieving a second image data including a second eigenvector of eyes, a second eigenvector of nose and a second eigenvector of mouth through the image sensor once the preset time is reached and the computer system does not receive the input signal from the peripheral input device;
    comparing the second eigenvector of eyes, the second eigenvector of nose and the second eigenvector of mouth in the second image data with the first eigenvector of eyes, the first eigenvector of nose and the first eigenvector of mouth in the first image data by the computer system; and
    the computer system entering the power-save mode, if a matching rate between the second eigenvector of eyes, the second eigenvector of nose and the second eigenvector of mouth in the second image data and the first eigenvector of eyes, the first eigenvector of nose and the first eigenvector of mouth in the first image data falls out of a specific range.

2. The method for determining the power-save mode of the multimedia application as claimed in claim 1, wherein when the matching rate between the second image data and the first image data falls within the specific range, the computer system enters the normal mode.

3. The method for determining the power-save mode of the multimedia application as claimed in claim 1, wherein when the matching rate between the second image data and the first image data falls out of the specific range, the computer system provides a password validation mechanism to verify the user's identity, and once the user's identity is confirmed to be correct, the computer system enters the normal mode.

4. The method for determining the power-save mode of the multimedia application as claimed in claim 1, wherein after the step that the computer system enters the power-save mode, the method comprises:
    the user activating a password validation mechanism through the peripheral input device; and
    the user inputting a password through the peripheral input device for being verified by the password validation mechanism, and the computer system entering the normal mode, once the password is confirmed to be correct.

5. The method for determining the power-save mode of the multimedia application as claimed in claim 1, wherein the peripheral input device is a key board, a mouse, or a touch panel.

6. The method for determining the power-save mode of the multimedia application as claimed in claim 5, wherein the input signal corresponds to a specific key or composite key.

7. The method for determining the power-save mode of the multimedia application as claimed in claim 1, wherein the specific range is from 60% to 100%.

8. A method for determining a power-save mode of multimedia application, taking an image data retrieved by an image sensor as a determining reference for controlling a computer system to enter a power-save mode from a normal mode, comprising:
    retrieving a first image data corresponding to a plurality of a user's facial features including a first eigenvector of eyes, a first eigenvector of nose and a first eigenvector of mouth by the image sensor, when the user operates the computer system through a peripheral input device;
    storing the first image data to the computer system;
    confirming whether an input signal from the peripheral input device is received or not within a preset time by the computer system;
    retrieving a second image data including a second eigenvector of eyes, a second eigenvector of nose and a second eigenvector of mouth through the image sensor once the preset time is reached and the computer system does not receive the input signal from the peripheral input device;
    comparing the second eigenvector of eyes, the second eigenvector of nose and the second eigenvector of mouth in the second image data with the first eigenvector of eyes, the first eigenvector of nose and the first eigenvector of mouth in the first image data by the computer system;
    the computer system entering the power-save mode, if a matching rate between the second eigenvector of eyes, the second eigenvector of nose and the second eigenvector of mouth in the second image data and the first eigenvector of eyes, the first eigenvector of nose and the first eigenvector of mouth in the first image data falls out of a specific range;
    retrieving a third image data including a third eigenvector of eyes, a third eigenvector of nose and a third eigenvector of mouth by the image sensor, when the computer system which is in the power-save mode confirms that the input signal is received;
    comparing the third eigenvector of eyes, the third eigenvector of nose and the third eigenvector of mouth in the third image data with the first eigenvector of eyes, the first eigenvector of nose and the first eigenvector of mouth in the first image data by the computer system; and
    the computer system entering the normal mode from the power-save mode, if a matching rate between the third eigenvector of eyes, the third eigenvector of nose and the third eigenvector of mouth in the third image data and the first eigenvector of eyes, the first eigenvector of nose and the first eigenvector of mouth in the first image data falls within the specific range.

9. The method for determining the power-save mode of the multimedia application as claimed in claim 8, wherein when the matching rate between the second image data and the first image data falls within the specific range, the computer system enters the normal mode.

10. The method for determining the power-save mode of the multimedia application as claimed in claim 8, wherein when the matching rate between the second image data and the first image data falls out of the specific range, the computer system provides a password validation mechanism to verify the user's identity, and once the user's identity is confirmed to be correct, the computer system enters the normal mode.

11. The method for determining the power-save mode of the multimedia application as claimed in claim 8, wherein after the step that the computer system enters the power-save mode, the method comprises:

the user activating a password validation mechanism through the peripheral input device; and the user inputting a password through the peripheral input device for being verified by the password validation mechanism, and the computer system entering the normal mode, once the password is confirmed to be correct.

12. The method for determining the power-save mode of the multimedia application as claimed in claim 8, wherein the peripheral input device is a keyboard, a mouse, or a touch panel.

13. The method for determining the power-save mode of the multimedia application as claimed in claim 12, wherein the input signal corresponds to a specific key or composite key.

14. The method for determining the power-save mode of the multimedia application as claimed in claim 8, wherein the specific range is from 60% to 100%.

* * * * *